Nov. 16, 1954     E. C. SULLIVAN     2,694,770
CONTROL MEANS FOR ELECTRICALLY HEATED COOKING RECEPTACLES
Filed Sept. 3, 1953
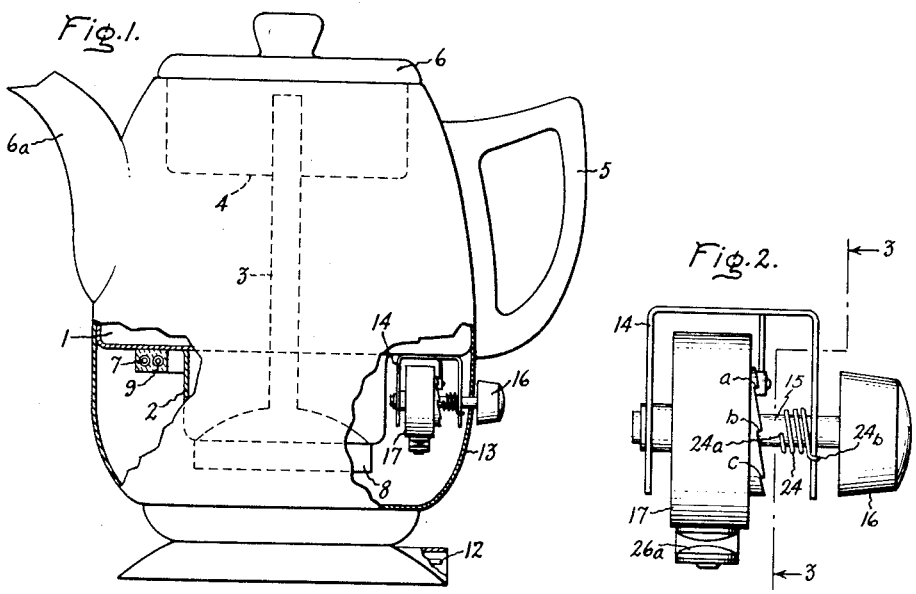
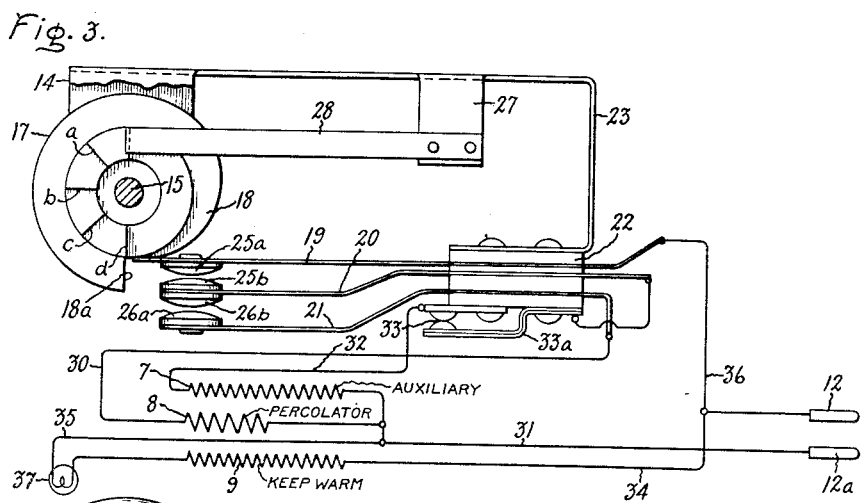
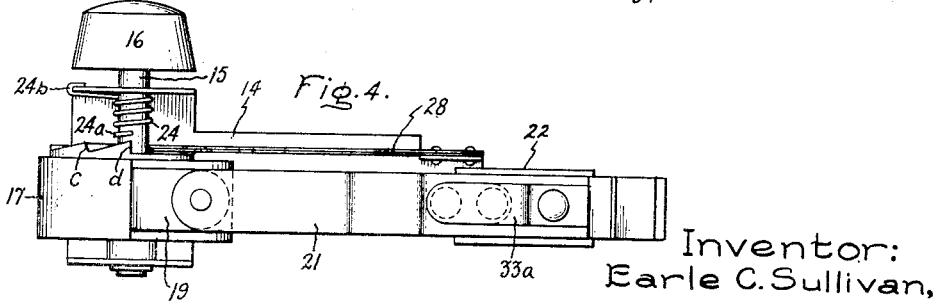
Inventor:
Earle C. Sullivan,
by His Attorney.

United States Patent Office 2,694,770
Patented Nov. 16, 1954

2,694,770

CONTROL MEANS FOR ELECTRICALLY HEATED COOKING RECEPTACLES

Earle C. Sullivan, Bridgeport, Conn., assignor to General Electric Company, a corporation of New York Application September 3, 1953, Serial No. 378,250

5 Claims. (Cl. 219—44)

The present invention relates to electrically heated cooking receptacles wherein it is desired to time a cooking operation therein. The invention is well adapted for use in electric coffee percolators and it is this application of my invention which I have elected specifically to illustrate and describe. It is to be understood, however, that the invention as to certain aspects is not limited to coffee percolators but may be used wherever found applicable.

The object of the invention is to provide an improved time control means responsive to the temperature of a cooking receptacle which is simple in structure, reliable in operation, and can be adjusted easily to vary the cooking time; and for a consideration of what I believe to be novel and my invention, attention is directed to the following specification and to the claims appended thereto.

According to the invention, switch means are provided for controlling the heating unit or heating units for the cooking receptacle; and for actuating the switch means there is provided a spring actuated cam held by a bimetallic thermostat, the cam being adjustable to change the setting of the thermostat for varying the length of the cooking operation.

In the drawing,

Fig. 1 is a side elevation, partly broken away, of a coffee percolator embodying the invention;

Fig. 2 is a detail view on a scale larger than that of Fig. 1, of the control mechanism;

Fig. 3 is a sectional view taken on line 3—3, Fig. 2, to which a wiring diagram has been added;

Fig. 4 is a bottom plan view of the control mechanism.

Referring to the drawing, 1 indicates the water receptacle of an electrically heated coffee percolator, 2 the well, 3 the fountain tube, 4 the ground coffee basket, 5 the handle, 6 the cover, and 6a the pouring spout. The percolator may be of any suitable construction. The electric heating unit or units may be of any suitable type and arranged in any suitable manner with respect to the coffee receptacle. In the present instance, as indicated in Fig. 3, there are provided three heating units, an auxiliary unit 7, a percolator unit 8, and a keep warm unit 9. The units are arranged with respect to the bottom wall of the percolator receptacle 1 and its pumping well 2 to impart heat to the water in the receptacle and well in the desired manner. The plug terminals to which a cord set may be connected to the heating units are indicated at 12 and 12a.

The operating parts of the percolator mechanism are illustrated in outline only as their specific construction forms no part of the present invention.

The present invention has to do with control means for the heating unit or units whereby the length of time during which percolation occurs and hence the strength of the brew may be regulated. When the invention embodies three heating units as illustrated, the arrangement may be such that when the percolator is connected to an electric circuit, initially all three units are in circuit in parallel; then after a predetermined water temperature is reached, the auxiliary unit is disconnected; and after a still higher temperature is reached the percolator unit is disconnected, leaving in circuit only the keep warm unit.

In base 13 of the percolator unit adjacent well 2 is a U-shaped bracket 14 which is suitably attached to the bottom wall of receptacle 1 as shown clearly in Fig. 1. Mounted to turn in the arms of bracket 14 is a shaft 15 which extends out through an opening in the side wall of base 13 and is provided on its end with an adjusting knob 16. Fixed on shaft 15 is a disc 17 of insulating material, the periphery of which is in the form of a cam 18 which engages the uppermost of three leaf spring switch blades 19, 20, and 21. Cam 18 terminates with a straight radially extending face 18a which forms a stop on the cam disk. Switch blades 19, 20, and 21 are carried by and insulated from each other by a block structure 22 of insulating material attached to an arm 23 on bracket 14 as shown in Fig. 3. Switch blade 19 has a contact 25a at its free end adapted to engage a contact 25b on switch blade 20; and switch blade 21 has a contact 26a at its free end adapted to engage a contact 26b on switch blade 20. The three switch blades are biased inherently to positions where their contacts are out of engagement.

Shaft 15 and disk 17 are biased to turn in a counterclockwise direction as viewed in Fig. 3 by a coiled spring 24 which surrounds the shaft and has one end fixed to the shaft as indicated at 24a and the other end fixed to bracket 14 as indicated at 24b. Spring 24 biases the disk to a position where the straight face 18a of the cam engages the end of leaf spring 19 which serves as a stop to limit turning movement of the cam in a counterclockwise direction. As shown in Figs. 3 and 4, the straight face of the cam is in engagement with the end of switch blade 19. On one side of disk 17 are a plurality of circumferentially arranged teeth, four being shown in the present instance. They are designated a, b, c, and d. As shown in Fig. 2, each succeeding tooth starting with tooth a is higher than the preceding tooth as measured from the side face of the disk. Fixed to an ear 27 on arm 23 is a bimetallic thermostat 28 having a hook at its free end positioned to engage teeth a to d. It is biased toward the side of the disk and when heated flexes in a direction to move from engagement with the teeth. Thermostat 28 is positioned with respect to receptacle 1 so as to be subjected to the temperature of the water or brew in the receptacle.

Percolator heating unit 8 is connected on one side by a conductor 30 to lower switch blade 21 and on the other side by conductor 31 to terminal 12a. Auxiliary heating unit 7 is connected on one side by a conductor 32 to middle switch blade 20 and on the other side to terminal 12a by conductor 31. In conductor 32 are the contacts 33 of a bimetallic thermostat 33a which may be carried by insulating block 22 and is positioned so as to be subjected to the temperature of the water or brew in the receptacle. Keep warm heating unit 9 is connected directly across terminals 12 and 12a by conductors 34 and 35. Upper switch blade 19 is connected directly to terminal 12 by a conductor 36. In circuit with heating unit 9 is a signal lamp 37.

Normally the straight face 18a of cam 18 is held against the end of switch blade 19 as shown in Figs. 3 and 4 by spring 24, and the hooked end of thermostat 28 rests against the flat side surface of disk 17 in advance of the first tooth a, i. e., to the right of it as viewed in Fig. 3. The contacts 25a, 25b, 26a, and 26b are out of contact with each other. Thermostat 28 is pre-loaded or biased against the side face of disk 17 with a desired amount of initial pressure whereby it is stressed by a predetermined amount. The arrangement is such that it would not move from engagement with such face until heated to a predetermined high temperature. The teeth are then made of successively increasing heights such that each succeeding tooth increases the pre-loading or stress in the bimetallic thermostat by an amount corresponding to a predetermined temperature rise. For example, the arrangement may be such that when the hook on the end of the bimetallic thermostat is in engagement with tooth a it will be pre-stressed to an extent such that it will be flexed to clear the tooth when heated to a temperature of 150° F. Then each succeeding tooth may have a height greater than the preceding tooth of an amount which will pre-stress the bimetallic thermostat to an additional extent such that ten additional degrees of heat will be required to flex it sufficiently to clear the tooth. In other words, tooth b may correspond to 160° F., tooth c to 170° F., and tooth d to 180° F. In this connection it will be understood that water or brew temperature in the receptacle of a percolator is a measure of heating time, and heating time in turn is a measure of percolating time or brew strength. Thus the desired percolating time or strength of brew can be obtained by the setting of cam 17 with respect to bimetallic thermostat 28.

Cam surface 18 has a rise such that when the cam disk is moved to bring tooth *a* into engagement with the hook on the end of thermostat 28, contact 25*a* will be moved into engagement with contact 25*b* to close the circuit through auxiliary heating unit 7. This is a re-heat position as explained hereinafter. When the cam disk is turned to bring the next tooth *b* or any succeeding tooth into engagement with the hook on the end of thermostat 28 the switch blades are moved to bring contact 26*b* into engagement with contact 26*a* also thus closing circuits through both the auxiliary heating unit and the percolator unit. Suitable indicia may be provided in connection with knob 16 to indicate the settings for it. For example, tooth *a* may be designated "reheat," tooth *b* may be designated "weak," tooth *c* may be designated "medium" and tooth *d* may be designated "strong."

In use, the desired quantity of water is placed in the vessel of the coffee pot and the desired amount of ground coffee is placed in the coffee basket. The user then rotates knob 16 to turn cam disk 17 counterclockwise as viewed in Fig. 3 to bring the hooked end of bimetallic thermostat 28 into engagement with a preselected tooth *b* to *d*, the tooth selected depending on the length of time it is desired to percolate the coffee, i. e., the strength of brew desired. When thus turned the cam surface 18 moves the contact blades to connect together contacts 25*a*, 25*b*, 26*a*, 26*b*. The terminals 12, 12*a* are then connected by a suitable cord set to a power circuit. This connects all three heating units 7, 8, and 9 in circuit. The heat from percolator heating unit 8 is confined primarily to heating water in well 2 while that from auxiliary heating unit 7 is utilized to heat the main body of water in receptacle 1. Usually when coffee is to be brewed, cold water is placed in the receptacle. The purpose of auxiliary heating unit 7 is to cooperate with heating unit 8 so as to impart heat quickly to the water to hasten the starting of percolation. It is for this reason that heating unit 7 is positioned as shown in Fig. 1. Keep warm heating unit 9 which is located along with heating unit 7 as indicated in Fig. 1 imparts some heat to the water or brew, but this unit is of low wattage so the amount is not great. After a heating up period percolation starts and after a predetermined temperature of water or brew is reached in receptacle 1, thermostat 33*a* flexes to separate contacts 33, thus opening the circuit through auxiliary heating unit 7. Percolator unit 8 remains in circuit and percolation continues until a temperature is reached at which thermostat 28 is flexed by an amount such that it clears the tooth with which it was engaged. When this occurs spring 24 rotates the cam disk in a clockwise direction as viewed in Fig. 3 to bring cam face 18*a* back into engagement with the end of contact blade 19 which, as stated above, serves as a stop for limiting turning movement, and permit contacts 25*a*, 25*b* and 26*a*, 26*b* to separate. This opens the circuit through the percolator unit 8; it also opens at contacts 26*a*, 26*b* the circuit of auxiliary heating unit 7. The keep warm unit remains in circuit to keep the brew hot. The brew may cool down to a temperature such that bimetallic thermostat 33*a* will again close contacts 33 but this will not close a circuit on heating unit 7 as such circuit is now open at contacts 26*a*, 26*b*. The keep warm unit is of a size to alone keep the brew at a suitable serving temperature.

If brew in the vessel is cold, it having been permitted to become cold by disconnecting the percolator from a power circuit, it may be reheated by again connecting the percolator to the power circuit and turning knob 16 to bring the first tooth *a* into engagement with the hook on the end of thermostat 28. This brings contact 25*a* into engagement with contact 25*b* to close a circuit through the auxiliary heating unit but does not close contacts 26*a* and 26*b* to close the percolator heating unit circuit. The auxiliary heating unit will then heat the brew up to a temperature such that thermostat 28 releases the cam disk whereupon it will be turned by spring 24 back to the open circuit position thus permitting contacts 25*a*, 25*b* to separate. The keep warm unit will then function to keep the brew warm.

The several heating units may have values to give the desired rate of heating. For example, for one size percolator I have found it to be satisfactory to use a 400 watt percolator heating unit, a 250 auxiliary heating unit and an 85 watt keep warm heating unit.

A major feature of my invention is the cam arrangement for adjusting the duration of time of percolation and hence the brew strength. Such arrangement forms a means for accomplishing the desired result which is simple in structure, reliable in operation, and not likely to get out of working order; and which at the same time can be manufactured at low cost. The cam disk is a simple part which can be molded from insulating material and provides both the cam surface for moving the switch blades and the height graduated teeth for cooperation with the bimetallic thermostat.

What I claim as new and desire to secure by Letters Patent of the United States is:

1. In an electric heating device, a receptacle, an electric heating unit for the receptacle, an electric circuit for the heating unit, a switch in said circuit, and control means for said switch comprising an adjustable cam which when turned effects closing and opening of the switch, a spring connected to the cam which biases it to a position wherein the switch is open, a series of teeth of different heights on the cam, and a bimetallic thermostat positioned to be responsive to the temperature of the heating device having an end which engages said teeth to hold the cam in an adjusted position against the action of said biasing spring whereby the thermostat may be stressed by different amounts by engaging it with different teeth to vary the temperature at which the thermostat releases said cam.

2. The combination defined by claim 1 wherein the cam is in the form of a disk, the cam surface being on the periphery of the disk and the series of teeth being on a side surface of the disk.

3. In an electric coffee percolator, a receptacle, an auxiliary heating unit and a percolator unit for the receptacle, an electric circuit for each unit, switch means in said circuits, and control means for said switch means comprising an adjustable cam which when turned effects closing and opening of the switch means, a spring connected to the cam which biases it to a position wherein the switch means is open, a series of teeth of different heights on the cam, and a bimetallic thermostat positioned to be responsive to the temperature of brew in the receptacle having an end which engages said teeth to hold the cam in an adjusted position against the action of said biasing spring whereby the thermostat may be stressed by different amounts by engaging it with different teeth to vary the temperature at which the thermostat releases said cam, said cam being so shaped that when moved to bring the first of said series of teeth into engagement with said thermostat end the circuit through said auxiliary heating unit is closed and when moved to bring succeeding teeth after the first tooth into engagement with said thermostat end the circuits through both said units are closed.

4. The combination defined by claim 3 wherein there is provided in the auxiliary heating unit circuit a second normally closed switch means, and thermostat means positioned to be responsive to brew temperature in the receptacle for opening such normally closed switch means when the brew temperature reaches a predetermined high value.

5. In an electric heating device, a receptacle, an electric heating unit for the receptacle, a bracket fixed to the receptacle, a cam disk pivotally mounted on the bracket having a cam surface and a series of teeth of successively increasing heights, an electric circuit for the heating unit, contacts in the electric circuit, means moved by said cam surface for effecting the opening and closing of said contacts, spring means connected to said cam disk for biasing it to a position wherein said contacts are open, and a thermostat positioned to be responsive to the temperature of the heating device having means for engagement with said successive teeth for holding the cam disk in circuit closing position against the action of said biasing means, said thermostat being stressed by the teeth by varying amounts to vary the temperature at which it releases the cam disk.

No references cited.